Feb. 17, 1925.

F. M. HERTLER

FLUID COATING APPARATUS

Filed June 23, 1923

INVENTOR
Frank Mathew Hertler
BY
Pennie, Davis, Marvin & Edmonds
ATTORNEYS

Feb. 17, 1925. 1,526,495
F. M. HERTLER
FLUID COATING APPARATUS
Filed June 23, 1923 2 Sheets-Sheet 2

Fig. 2.

INVENTOR
Frank Mathew Hertler,
BY
Pennie, Davis, Marvin & Edmonds
ATTORNEYS

Patented Feb. 17, 1925.

1,526,495

UNITED STATES PATENT OFFICE.

FRANK MATHEW HERTLER, OF EAST ORANGE, NEW JERSEY, ASSIGNOR TO FLOOD & CONKLIN COMPANY, OF NEWARK, NEW JERSEY, A CORPORATION OF NEW JERSEY.

FLUID-COATING APPARATUS.

Application filed June 23, 1923. Serial No. 647,207.

*To all whom it may concern:*

Be it known that I, FRANK MATHEW HERTLER, a citizen of the United States, residing at East Orange, in the county of Essex, State of New Jersey, have invented certain new and useful Improvements in Fluid-Coating Apparatus; and I do hereby declare the following to be a full, clear, and exact description of the invention, such as will enable others skilled in the art to which it appertains to make and use the same.

The present invention relates to processes and apparatus for applying coats of fluid substances to articles, and has for its object the provision of means whereby articles may be cheaply and quickly coated with a smooth film.

Among the various methods for applying coating-fluids to articles, the process of dipping the entire article into the fluid has been held to possess the greatest commercial possibilities. However, it has been found that during the commonly employed dipping processes, dust particles were washed to the bottom of the dipping tank, and in a short time sediment was accumulated. At intervals it was necessary to mix with the liquid already in the tank more coating-liquid, or more "thinner". This mixing process stirred up the sediment, which required some time to settle before the dipping bath could be used. Most of the tanks were not closed dust tight during the dipping, and, further, the articles were necessarily in a wet state when removed from the tank. Because of these conditions a dirty surface was commonly the result.

While it is well known in the art that articles may be immersed in a coating-liquid which may subsequently be drawn off from the containing tank, it is generally understood that this process has been resorted to primarily in order to separate the articles coated from the bulk of the coating-liquid without causing vibration with its resultant effect of producing ridges on the surface of the article. This effect is known in the art as "lapping".

Prior to the present invention, the rate of drawing off the liquid from the article being coated was considered unimportant, and the usual practice has been, therefore, to empty the tanks by drawing the liquid off by gravity. The unevenness of coating resulting from this method has always been noticeable, but recently has become more serious as the tendency to use more rapidly drying coating-liquids has increased. To reduce the costs of time and labor, the use of various quick-drying lacquers has become very desirable, and the use of these lacquers is largely supplanting that of the old slow-drying varnishes even upon the highest grade of work. As a result of experiment it has been found that the drawing off of the liquid from the article being coated must be very exactly controlled in order that the finished coating may be even. This is due to the fact that when an article is immersed in a coating-liquid and then separated therefrom either by withdrawing the article from the liquid or by draining the liquid from the tank while the article is held stationary therein, the excess liquid which cannot adhere to the surface of the article will flow by gravity down its surface. It follows that the surface adjacent to the lowest edge of the article as it is supported in the dipping tank will receive the thickest coating, because all of the excess of liquid flowing down from the surface above must flow over the lowest parts. It has been further determined that this effect of uneven coating becomes more apparent as the vertical dimension of the article is increased and as a more rapidly-drying coating-liquid is employed, because, due to evaporation, the liquid increases in viscosity as it flows down the surface of the article. For the foregoing reasons the further economic expedient of applying quick-drying lacquers by dipping has until now been largely unsuccessful. In order to provide means which will overcome these defects it is necessary to consider the following fundamentals:

Any given fluid has a normal rate of surface flow over a given article, the surface of which is at a given angle to the vertical, and if the surface of the coating-fluid be separated from the article at the same rate as that fluid's normal rate of surface flow, the coating will be of constant thickness over the whole surface of the article. This result is obtained whether the fluid be drawn away from the stationary article or the article be withdrawn from the stationary fluid or both fluid and article be moved away from each other.

Furthermore, the atmosphere immediately above the surface of the coating-liquid normally contains a large amount of fumes from the coating-liquid, which fumes consist mostly of solvents. These fumes, or vapors, have a marked solvent effect upon the film of coating-liquid on the surface of the article, hence the length of time they are allowed to act on the film largely determines the thickness of the coating. It is plain that if the bulk of the liquid be separated quickly from the article, these vapors will not have an opportunity to thin or dilute the coating and the result will be a film thicker than it would be if the solvent action were effective for a longer time. This control of the thickness of the coating may thus be obtained by regulation of the rate at which the surface of the coating-liquid moves relative to the article, but, as stated before, in order that the coat be of uniform thickness, that rate must be proportional to or be a function of the rate of normal surface flow of that liquid on that article.

It is proposed to overcome the objections and difficulties outlined by means of a new method and apparatus. The method consists in immersing the article in a coating-fluid and then separating the article and the liquid at a rate determined by the normal rate of flow of the coating-liquid on the surface to be coated. The apparatus comprises a plurality of normally closed tanks provided with means for conveniently inserting articles, and other means for transferring the liquid from one tank to another at a predetermined rate, and simultaneously filtering out foreign material from the coating-liquid. Other improvements are also provided which, together with the reasons therefor, will more clearly appear from a consideration of the following general description.

In accordance with the preferred embodiment of this invention three tanks are provided. Two of them, which may be of the same size, are the tanks in which the articles are coated by dipping, and are commonly called "dipping" tanks. The third, or "reservoir" tank, has preferably the combined capacity of the dipping tanks, and may be mounted above the dipping tanks so that the liquid can flow by gravity into the latter in order to eliminate air bubbles which are sometimes introduced by a pump. These three tanks may be so connected by piping that a single pumping unit may be used to transfer the liquid interchangeably from one to another. It is also possible, and usually desirable, to employ a filtering unit which may be located in the piping system adjacent to the pump so that whenever a tank is drained, the coating-liquid may be completely freed of any sediment or foreign matter. In a large commercial installation this means of filtering results in a great saving of time.

The ventilation in the tank has a marked influence upon the action of the solvent vapors, and in this embodiment is controlled by suitable blowers which may be connected with the tanks by ducts. In this manner the proportion of the solvent vapors within the tank may be regulated. It has also been found desirable at the proper time by means of a similar blower to force clean air of the correct temperature and humidity into the tank in order to hasten the drying process. It is sometimes advisable to provide for each tank another duct for an intake or exhaust in conjunction with the blower duct above referred to. In the preferred embodiment, however, this second duct has been dispensed with by the simpler expedient of opening doors provided in the side of the dipping tank. These doors are designed to open downward so that when fully opened, the articles to be coated may be rolled into the tank on a supporting truck running on tracks either above or beneath the truck. This means of handling the articles to be coated results in a great saving of time and power required by the previously employed method of hoisting the articles, swinging them over the tank and then lowering them into the coating-liquid. By means of this invention the articles may be rolled into the tank, coated, and rolled out the opposite side while another truckload of articles is being rolled in, thus making the process practically continuous. The sliding doors may be controlled by electrical, mechanical, hydraulic, or other means, and opened slowly so as to follow the falling liquid level, in order to make it easy for an attendant to reach in with a wiper to remove excess liquid from parts such as mouldings, corners, edges, brackets, and the like. The bottoms of the dipping tanks are preferably a few inches below the floor level and slope towards a drain cock in the center for the purpose of collecting any comparatively heavy foreign matter which may find its way into the tanks.

For some purposes a motor driven centrifugal pump has been found satisfactory for emptying the tanks at a given rate, as determined by its motor speed control rheostat; but for more accurate discharge rates a displacement-type pump may be employed, or any other type not affected by the falling head of liquid in the tank. In practice this change in the head has not been found to be of much consequence, since the pump may be located at such a distance below the tanks as to make the fall in head in the tanks only a small fraction of the average head effective at the pump. The controls which regulate the rate of discharge of the liquid from the tanks are preferably situated near the door controls, and an advantageous arrangement has proved to be a means for coupling the two controls together so that the doors and liquid pump may be operated simultaneously.

When it is required to coat articles of irregular shape, or, in other words, when the displacement of the immersed articles varies materially at different levels in the containing tank, the rate of withdrawal of the liquid from the tank must be varied proportionately in order that the desired rate of separation of liquid and articles may remain constant. However, it is usually possible to arrange articles in the tank so that the effective displacement at different levels is nearly constant; or, if many articles of a particular contour are to be coated, dipping tanks to be used therewith may be shaped to correspond to that contour, so that the rate of drawing off the liquid may thereby be substantially constant. As a means for ascertaining that the rate at which the coating-liquid is being withdrawn from the article is proportional to the rate of normal surface flow of the liquid on the article, it has been found practicable to calibrate the rheostat which controls the speed of the motor driven pump so as to indicate the proper setting for any given coating-liquid. This calibration may best be determined as the result of experiments.

A more complete understanding of the invention may be had from the following description of preferred embodiments as illustrated in the accompanying drawings, in which—

Fig. 2 represents in elevation two dipping tanks and a reservoir tank suitably connected with a pump and filters by a piping system.

Figure 1:
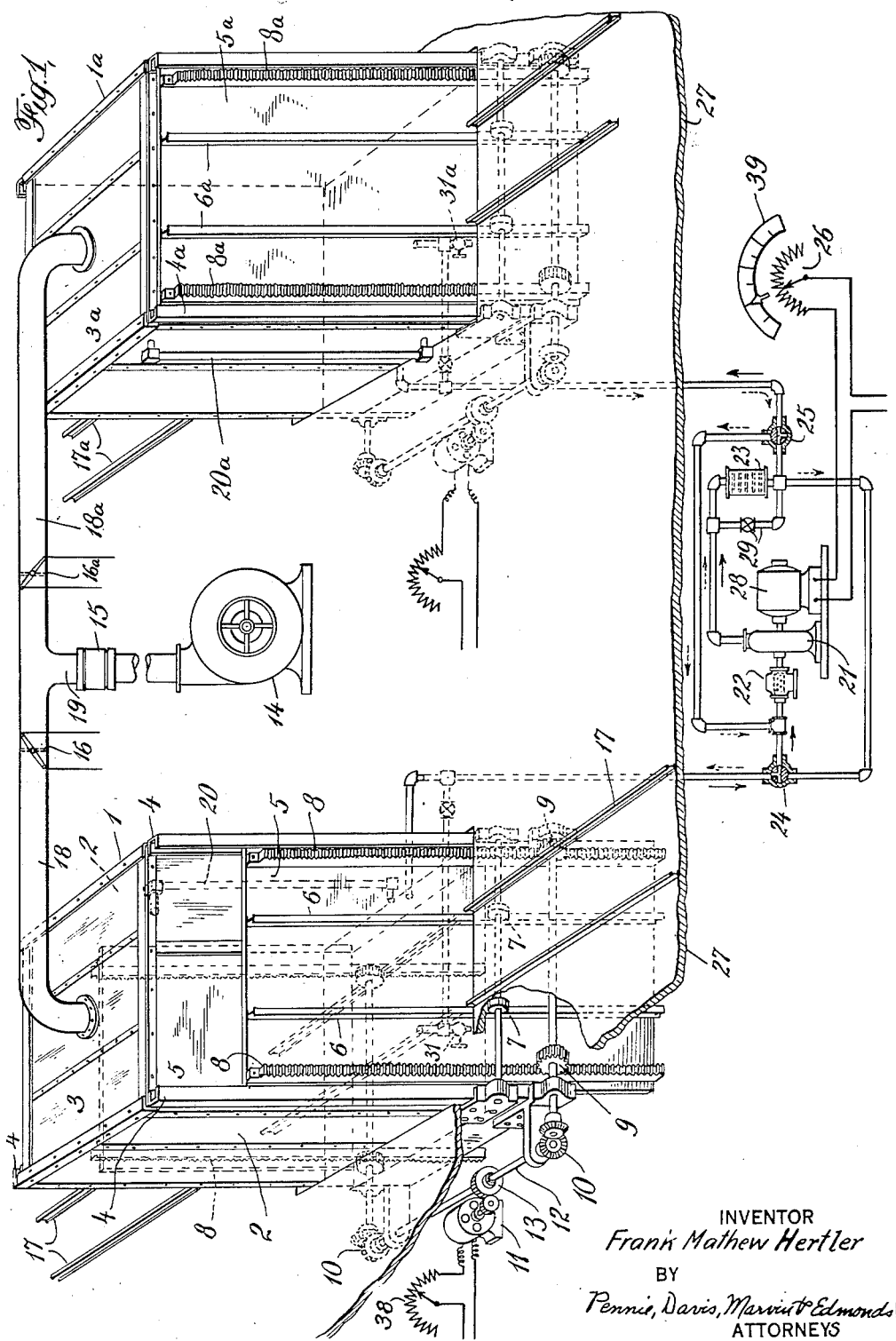
Fig. 1 is a view showing in perspective two dipping tanks together with a pump and its piping system, filters, and a ventilating system.

Referring to Fig. 1, two dipping tanks 1 and 1ª are shown. To simplify the drawing, tank 1 is shown in more detail than tank 1ª, so that a description of tank 1 will serve for both. Tank 1, which in a commercial installation may be about nine feet long, seven feet wide and six feet high and of about 2800 gallons capacity, is constructed preferably of sheet steel, copper, or other suitable material sufficiently reinforced to constitute a rigid container. The side members 2 and top 3 are permanently and rigidly held together and serve to support the accurately machined guide grooves 4 in which the doors 5 slide. It will be noted that doors 5 are shown partly open, while doors 5ª in tank 1ª are shown closed. These doors must be fitted accurately in guide grooves 4 so as to make as nearly as possible a liquid-tight joint. A drip pan, not shown, may be provided beneath the doors to catch any small amount of leakage. The rails 6 are designed to strengthen the doors and to run against the wheels 7 placed beneath the floor level 27, thus serving to remove from the guide grooves 4 most of the strain due to liquid pressure on the doors. Toothed racks 8, placed near the vertical edges of the doors, engage pinions 9, which are driven by the electric motor 11 through reduction gears 13, counter shaft 12 and bevel gears 10. In this way the doors may be opened and closed at a speed regulated by means of motor control rheostat 38. It is preferable to use a worm drive for reduction gears 13, since that type is irreversible and will lock the doors in any position. However, this method of moving the doors by rack and pinion tends to produce a certain amount of vibration which is objectionable if the doors are to be opened during the coating process, in which case it is desirable to move them by hydraulic or other vibrationless means chosen as best suited to any individual installation.

Although a certain amount of ventilation can be obtained by opening the doors 5, it is usually preferable, in order to insure positive results, to include a blower 14 which may be here considered as either a blower or a suction fan. By this means the density of the vapor within the tank can be quickly varied so that the solvent action is increased or retarded. The amount of vapor moved in or out of the tanks may be regulated by dampers 16 and 16ª located in ducts 18 and 18ª. The flexible union 15, which may be of rubber-impregnated canvas or other suitable material, is inserted in the ducts 19 between the blower 14 and tanks 1 and 1ª to eliminate the possibility of any vibration from the blower being carried into the tanks. It will be noted that tracks 17 run through the tank and extend out both sides. This provision allows the articles, which may be supported in a suitable rack, to be rolled upon the track into the tank from either side, and after the coating application is complete, to be removed from either side. It is desirable to suspend some sorts of articles from an overhead track running into the upper part of the tank rather than to use a track on the floor as illustrated. If a few small articles are to be coated, it is expedient to utilize a tank of somewhat smaller dimensions than either of the tanks here illustrated, in which case the articles may be suspended in the tank from above and the sliding doors and tracks eliminated. Other useful modifications of this part of the invention will at once be apparent to those skilled in the art.

At 20 and 20ª are shown gauge-glasses whose two ends open into the top and bottom of the tanks respectively. These gauges indicate at all times the liquid level in the tanks and are a means whereby the rate of fall of the surface of the coating-fluid in the tanks may be ascertained. It is sometimes desirable, however, to employ other types of gauges for this purpose.

A pumping system with its control valves and filters is shown, for the sake of clearness, as located beneath the floor 27, although it is usually preferable to place all controls above the floor and near the tanks. This system comprises the pump 21 here represented as a centrifugal pump direct connected to an electric motor 28 whose speed is controlled by rheostat 26 according to a scale 39 calibrated in terms of the normal rate of flow on the surface of the article. On the intake side of the pump is shown a strainer 22 for the purpose of removing the coarse type of sediment or foreign matter from the coating-liquid, and which is designed to introduce but little circulation resistance to the system. The filter 23 is for the purpose of removing all the remaining sediment from the liquid and is preferably placed on the exhaust side of the pump where the pressure is greatest. This filter 23 may be cut out by a by-pass pipe and valve 29 connecting both sides of the filter. The setting of the three-way valves 24 and 25 determines the direction of flow of the liquid so that one pump may fill or discharge either tank. This piping layout would, of course, be modified to suit any particular installation. The solid arrows shown in Fig. 1 follow the course of the liquid as it is circulated from tank 1 to tank 1ª, while the dotted arrows indicate the course of the liquid as it flows in the reverse direction.

In Fig. 2 a simplified elevational view of the dipping tanks 1 and 1ª is shown with the addition of a reservoir tank 30. This tank, preferably of at least the capacity of both dipping tanks, is situated above the latter so that the liquid may be run by gravity into either dipping tank. This procedure eliminates the possibility of the existence in the liquid of air bubbles which are likely to be introduced at the pump. Air bubbles in the coating-liquid produce bare spots and irregularities in the coating, and can be removed by allowing the liquid to remain at rest in the tank until the bubbles rise to the surface, but this procedure results in considerable loss of time. It will be noted in Fig. 2 that the bottoms of the tanks 1 and 1ª slope beneath the floor level 27 towards the drains 31 and 31ª, which combination serves as a sediment trap. The piping system shown in Fig. 2 is identical with that described in connection with Fig. 1 except for the addition of the pipes 33 and 34 leading to the reservoir tank and also for the pipe 37, which may act as a breather for the tank, or may be considered to represent a further source of liquid supply. By means of pipes 33 and 34 and through the control provided by valves 35 and 36 together with the three-way valves 24 and 25, it can be readily observed that the liquid may be pumped from any one to another of the three tanks illustrated.

It is to be understood that the piping system just described is only one of many possible methods of interconnecting the tanks by piping; and further that all the foregoing description of preferred embodiments is not in any way intended to limit the spirit or scope of this invention, since many modifications will at once occur to those skilled in the art.

I claim:

1. A dipping tank having substantially vertical sides and adapted to contain a liquid-substance in which an article to be coated therewith may be submerged, at least one of said vertical sides being adapted to be opened and closed so as to facilitate the admission and removal of said article to and from said dipping tank.

2. A dipping tank having side members and adapted to contain a liquid-substance in which an article to be coated therewith may be submerged, one of said side members being slidably mounted, and means for slidably operating said side member.

3. In combination with a tank having substantially vertical side members and adapted to contain a liquid-substance in which an article to be coated therewith may be submerged, a pair of movable side members oppositely situated and slidably supported on said tank, and means for simultaneously sliding said side members.

4. In combination with a tank adapted to contain a liquid substance in which an article to be coated therewith may be submerged, pumping means for withdrawing said liquid-substance from said tank, means for controlling the rate at which said pumping means withdraws said liquid-substance from said tank so that the rate at which the surface of said liquid-substance moves relative to said article shall be proportional to the rate of normal surface flow of said liquid-substance upon said article, a pair of movable side members oppositely situated and slidably supported in said tank, and means for simultaneously sliding said side members in said tank at a rate proportional to the rate of normal surface flow of said liquid-substance upon said article.

5. In combination, a pair of dipping tanks adapted to contain a liquid-substance in which an article to be coated therewith may be submerged, piping means for interconnecting said tanks, pumping means for flowing said liquid-substance from one to the other of said tanks, regulating means for controlling the rate at which said pumping means withdraws said liquid-substance from said tank so that the rate at which the surface of said liquid moves relative to said article shall be a function of the rate of normal surface flow of said liquid-substance upon said article, filtering means interpolated in said piping, a pair of doors in each of said dipping tanks, said doors being slidably supported in opposite sides of said tanks, and means for sliding said doors in a substantially vertical plane.

6. In combination with a pair of dipping tanks adapted to contain a liquid-substance in which an article to be coated therewith may be submerged, piping means for interconnecting said dipping tanks, a reservoir tank connected by piping with said pair of dipping tanks, pumping means for flowing said liquid-substance from one to another of said tanks, regulating means for controlling the rate at which said pumping means withdraws said liquid-substance from either of said dipping tanks, so that the rate at which the surface of said liquid-substance moves relative to said article shall be a function of the rate of normal surface flow of said liquid-substance upon said article, filtering means interpolated in said piping, a pair of doors in each of said dipping tanks, said doors being slidably supported in opposite sides of said tanks, means for sliding said doors in a substantially vertical plane, and a track running into each of said dipping tanks for conveying said articles into and out of said dipping tanks.

In testimony whereof I affix my signature.

FRANK MATHEW HERTLER.